METHOD AND APPARATUS FOR MAKING MAGNETIC TAPE RECORDS

Filed April 3, 1947

2 Sheets-Sheet 1

INVENTOR
Bruce Roberts
BY
Symmestvedt & Lechner
ATTORNEYS

METHOD AND APPARATUS FOR MAKING MAGNETIC TAPE RECORDS

Filed April 3, 1947 2 Sheets-Sheet 2

INVENTOR
Bruce Roberts
BY
Symmestvedt & Lechner
ATTORNEYS

United States Patent Office 2,698,359

Patented Dec. 28, 1954

2,698,359

METHOD AND APPARATUS FOR MAKING MAGNETIC TAPE RECORDS

Bruce Roberts, Philadelphia, Pa., assignor to The International Electronics Company, Philadelphia, Pa., a corporation of Pennsylvania Application April 3, 1947, Serial No. 739,181

11 Claims. (Cl. 179—100.2)

This invention relates to magnetic recording, and is particularly concerned with a method and apparatus for making magnetic tape records.

One of the primary objects of the invention is the provision of a method and apparatus for concurrently making a plurality of duplicate tape records from a master recording.

The invention is especially useful in the duplicating of magnetic recordings of considerable length, i. e., of the type adapted for the uninterrupted reproduction of extended program music or other intelligence.

Another object of the invention is to provide for the making of a multiplicity of tape recordings from a broad web of magnetizable record sheeting, such as paper sheeting carrying a coating in which magnetizable particles are dispersed. In this way, the over-all manufacturing technique is greatly simplified, since broad web magnetizable sheeting may much more economically be manufactured than is the case in handling and coating individual narrow tape records.

According to the invention the broad web material is recorded in a multiplicity of parallel tracks extended lengthwise of the sheeting and concurrently the sheeting is slit along lines between recorded tracks, to thereby form narrow tape records.

The method and equipment of the invention are also adapted to insure constant speed of travel of the sheeting during recording, and to insure appropriate tensioning of the sheeting and of the individual tapes slit therefrom during the recording, slitting and winding up of the tape records thus formed.

In accordance with another aspect of the invention, provision is made for concurrently recording a plurality of record tracks on a given tape. Moreover, the intelligence recorded in alternate tracks may be inverted lengthwise of the record, to provide for sequential reproduction of tracks on the tape by scanning one track in one direction and then scanning an adjacent track in the reverse direction. In a typical case two such reversely oriented tracks are recorded on each tape. It may here be noted that a reproducing machine for a tape recorded in this way is fully disclosed in my copending application, Serial No. 715,518, dated December 11, 1946, issued January 13, 1953, as Patent No. 2,625,611.

How the foregoing and other objects and advantages are achieved will appear more fully from the following description and the accompanying drawings, in which—

Figure 1:
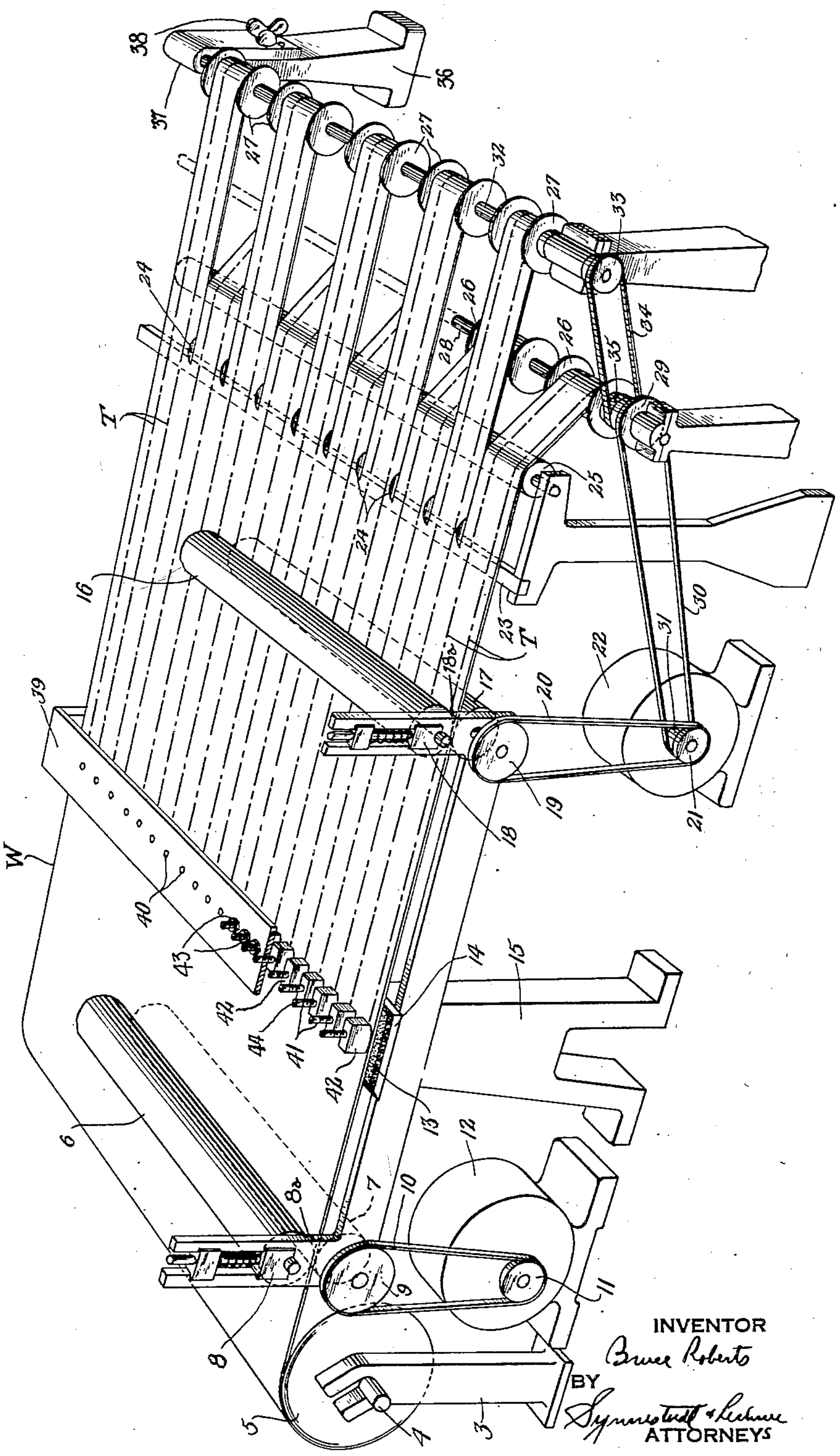
Figure 2:
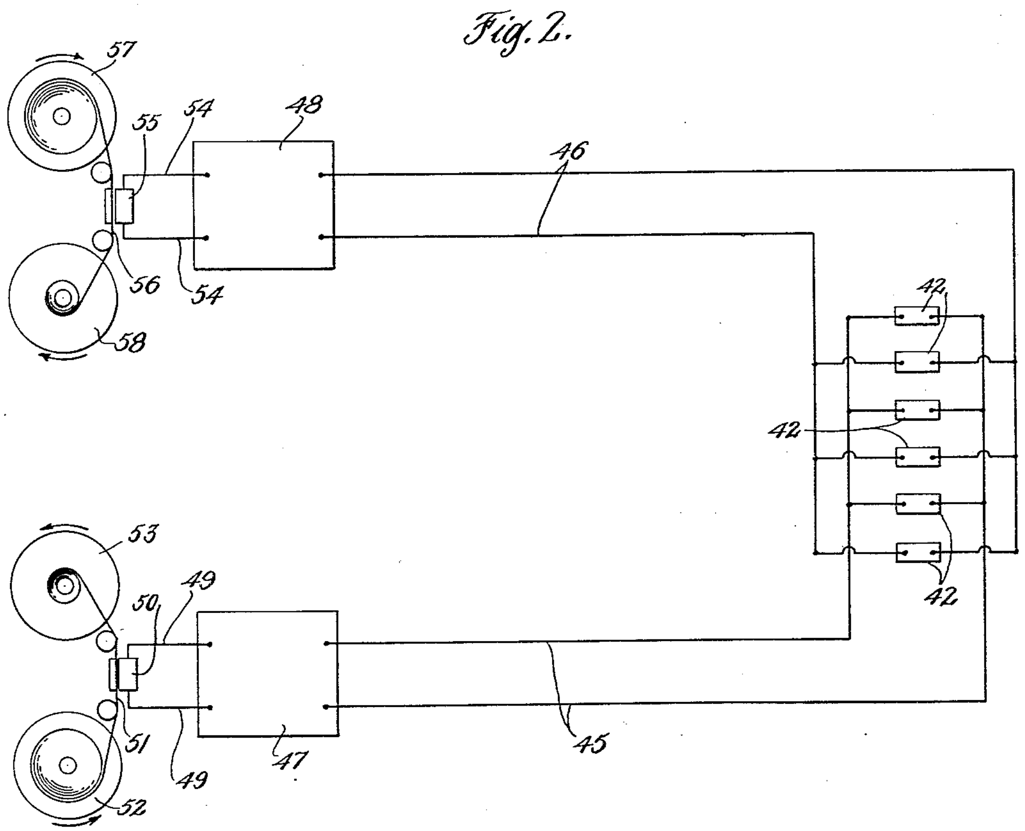

Figure 1 is a perspective view of essential parts of recording equipment according to the invention; and Figure 2 is a diagram of certain portions of the equipment shown in Figure 1 electrically coupled with certain other devices employed according to the invention.

Referring first to Figure 1, a pair of standards such as indicated at 3 are provided to support a shaft 4 on which is carried a roll 5 of broad web sheeting, for instance, paper sheeting having an over-all coating, with magnetized particles dispersed therein. The sheeting web W is fed from the roll 5 between a pair of feed rolls 6—7, with the magnetizable coating presented upwardly. Roll 6 is yieldingly urged against roll 7 as by spring mounted blocks 8, which are carried by upright supports 8*a* serving also as guides for positioning the web W as it is being advanced. Roll 7 is driven by a pulley 9 cooperating with a belt 10 which in turn passes around pulley 11 of the motor 12.

From the feed rolls 6—7, the web W is passed over a yielding support, such as the sponge rubber pad 13, which is carried on a transverse plate 14 mounted at the top of standards such as indicated at 15. The recording devices cooperating with the web in the region of the resilient pad 13, as is described more fully herebelow.

After leaving the recording equipment, the web W is passed between a second pair of feed rolls 16—17, the former of which is yieldingly pressed downwardly by spring pressed blocks 18, which are carried by upright supports 18*a*, these supports also serving as web guides. Roll 17 is driven by pulley 19 cooperating with belt 20 which passes around a pulley 21 on the shaft of motor 22.

Beyond the rolls 16—17, the web passes over a transverse bar 23 carrying a series of upwardly projecting slitting-knives 24 by means of which the broad web is divided into a multiplicity of tape records whose breadth is determined by the spacing of the knives 24. The tape records then pass over a roll or guide 25, and beyond this roll, the feed paths of alternate tapes diverge from each other to provide for individual winding up of the tapes on appropriate tape reels such as shown at 26 and 27.

Reels 26 are mounted on a transverse shaft 28 which is driven by a pulley 29 cooperating with belt 30 which also passes around another pulley 31 fixed on the shaft of motor 22 above mentioned. Reels 27 are mounted on a transverse shaft 32 carrying a sprocket 33 which cooperates with chain 34, the latter also being in engagement with sprocket 35 which is fixed to shaft 28.

The motor 22 thus serves to drive both the shafts 28 and 32 and thus both groups of tape reels 26 and 27. Reels 26 are advantageously splined on shaft 28, so that the reels may readily be slipped off one end of the shaft. Similarly reels 27 are splined on shaft 32 for the same purpose. In order to enable ready removal of the reels from the shafts 28 and 32, the support for one end of each shaft, the far end as viewed in Figure 1, is arranged for removal and displacement out of the path of the reels as they are slid off the end of the shaft. Thus, as shown in Figure 1, the support for the far end of each of shafts 28 and 32 includes a base part 36 carrying a removable upper part 37 adapted to be secured in place by a wing nut 38.

Turning now to the recording equipment, it will be seen that a supporting plate 39 is arranged transversely of the web above the resilient pad 13 and in spaced relation above the web itself. This plate is provided with a plurality of apertures 40 each one of which is adapted to receive an upright mounting pin 41 of a magnetic recording head 42, there being a multiplicity of such heads arranged transversely of the web, each positioned to scan a track on the web. It is of importance for high quality recording and subsequent reproduction that each head be accurately positioned about a vertical axis. Such recording heads, as is known, comprise an electromagnet having two pole pieces with a very small flux gap therebetween, and the relative orientation of the pole pieces and gap with reference to the track scanned should be accurately maintained, preferably with the flux gap at 90° to the path of scanning. With the above in mind means are provided for adjustment of the position of each head about a vertical axis with relation to the supporting plate 39. For this purpose the pins 41 are threaded to cooperate with fastening nuts 43, each pin also being slotted as at 44, to receive a screwdriver which may be employed in effecting the adjustment when the nuts 43 are loosened.

Before considering the preferred method of recording, attention is called to the fact that the invention contemplates maintaining constant speed advancement of the web by employing a constant speed drive for the feed roll 7. This is advantageously achieved by using a synchronous motor 12 for driving the feed roll 7. Moreover, the roll 7 desirably has a surface characterized by a high coefficient of friction, for which purpose this roll is covered with a material such as rubber. The mating roll 6 may also be surfaced with a material having a high coefficient of friction.

The drive of feed roll 17 is effected by drive means tending to advance the web at a slightly higher speed than that established by rolls 6—7. To accomplish this, roll 17 is driven at a speed slightly higher than roll 7 and roll 17 is surfaced with a material having a somewhat lower coefficient of friction than in the case of roll 7. By driving the feed rolls in the manner described, the web is placed under tension as it passes the recording heads, this also being desirable to ensure high quality recording and subsequent reproduction. It may be noted that any feed roll slippage taking place, occurs as between roll 17 and the side of the web opposite to that carrying the magnetizable coating.

The drive of reel shafts 28 and 32 is also effected by drive means tending to overspeed these shafts. This is important for two reasons, first, to insure tensioning of the web in the region of the slitting knives 24, and second, to provide for continuous winding up of the tapes under tension on the reels 26 and 27 throughout the entire winding-up operation, during which the diameter of the wound tape is progressively increasing. Although this type of drive for the reel shafts may be effected by means of a friction slip clutch, this purpose may be served by a belt 30 of such frictional characteristics as to slip on one or both of pulleys 29 and 31.

The several feeding or driving means for the web are arranged so that the speed of advancement of the web is positively determined and maintained constant by the feed rolls 6—7 and the synchronous motor 12.

As shown in Figure 2, in the preferred arrangement of the invention, the electric connections of alternate recording heads 42 are coupled in parallel in circuits 45 and 46. Circuit 45 is connected with the output of an electronic amplifier diagrammatically indicated at 47; and circuit 46 is similarly connected with the output of amplifier 48. The input circuit 49 of amplifier 47 is associated with a magnetic pick-up head 50 arranged in scanning relation to a master record 51 adapted to be reeled from reel 52 to reel 53 in the direction indicated by the arrows. On the other hand, the input circuit 54 for amplifier 48 is associated with a magnetic pick-up 55 which is in scanning relation with a master record 56 adapted to be reeled from reel 57 to reel 58 in the direction indicated by the arrows.

In using the system diagrammed in Figure 2 for a typical recording operation, one-half of a given amount of intelligence to be ultimately recorded on a given tape, for instance one-half of a symphony, is recorded on a master record 51, and the other half on a master record 56. These two master records are then scanned in opposite directions, i. e., one being scanned in a direction inverted with relation to the direction of its recording; and by virtue of the two output circuits 45 and 46 of the amplifiers 47 and 48, alternate recording heads 42 transversely of the record sheeting are energized, respectively, with normal and inverted intelligence to be recorded.

Attention is now called to the fact that the slitting plates 24 shown in Figure 1 are arranged between alternate pairs of tracks, so that each tape slit from the web carries two recorded tracks, such as those diagrammatically indicated at T in Figure 1. Because of the method of recording described above, the intelligence recorded in one of these tracks is arranged for scanning in one direction of the tape, and that in the other track is arranged for scanning in the opposite direction. The tape record as a whole, therefore, may be played back or reproduced by first scanning one track in one direction and then scanning the other track in the other direction. Equipment for such play-back of a multiple track tape is fully disclosed in my copending application above referred to.

In the preferred practice of the invention, it is contemplated that the sheeting being recorded be driven at a speed higher than the speed at which it is intended to ultimately reproduce the tape records being made. In a typical recording operation the master records 51 and 56 (see Figure 2) are made at a speed equal to the speed at which the records being formed are intended to be reproduced; but when the duplicates are being recorded from the master records, both the master records and the sheeting are driven at corresponding increased speeds, say 5 or 6 times the reproduction speed. In this way, great saving in time is effected in making the duplicate recordings. For example, a tape requiring one-half hour to scan in one direction when being played back, may readily be recorded in a matter of a few minutes. The output of the recording equipment, therefore, is greatly increased.

After completion of a recording operation, the tapes are cut off, as with a knife or shears. The reels 26 and 27 are then removed and new groups of reels inserted so as to wind up the tapes made during a succeeding recording operation.

I claim:

1. A method for making a tape type magnetic record having two continuous sound record tracks thereon oppositely oriented lengthwise of the tape to provide for reproduction by magnetic scanning in opposite directions, which method comprises first making two master records the first having recorded thereon the intelligence to be recorded in a first track of the tape and the second having recorded thereon the intelligence to be recorded in a second track of the tape, concurrently continuously scanning the master records in relatively inverted directions, and concurrently recording the intelligence from the first master record in the first track of the tape and from the second master record in the second track of the tape by magnetically scanning both of the tape tracks in the same direction.

2. A method for making a tape type magnetic record having two continuous sound record tracks thereon oppositely oriented lengthwise of the record to provide for reproduction by sequential scanning of the two tracks in opposite directions, which method comprises concurrently continuously scanning master recordings of the material desired on the two tracks of the tape record to be made, the sense of scanning of the master for one track of the tape being from the beginning to the end of the material to be recorded on said one track and the sense of scanning of the master for the other track of the tape being from the end to the beginning of the material to be recorded on said other record track, and transferring the material thus scanned on the masters to the two tracks of the tape by concurrently continuously scanning both tracks of the tape in the same direction lengthwise of the tape.

3. Apparatus for making a tape type magnetic record having two continuous sound record tracks thereon oppositely oriented lengthwise of the record to provide for reproduction by sequential scanning of the two tracks in opposite directions, which apparatus comprises mechanism for translating the tape in one direction during recording, a pair of independently operable magnetic recording heads positioned to scan side-by-side tracks on the tape, while the tape is translated in said direction, and mechanism for feeding signals to said recording heads including a device for scanning from beginning-to-end a master recording of the material to be recorded on one track by one recording head, and a device for scanning from end-to-beginning a master recording of the material to be recorded on the other track by the other recording head.

4. An apparatus for producing a plurality of sound tracks upon a sound track carrier which comprises: means for continuously advancing a sound track carrier; and means for simultaneously recording on said carrier at least two sound tracks in inversed relation to each other.

5. A method for making an elongated magnetic record having two continuous sound record tracks thereon oppositely oriented lengthwise of the record to provide for reproduction by scanning in opposite directions, which method comprises concurrently continuously scanning both of said tracks in a single pass from one end of the record toward the other and during said scanning recording intelligence in one track in the direction of scanning and recording intelligence in the other track inverted with respect to the direction of scanning.

6. A method for making tape type magnetic records each having an even number of continuous sound record tracks thereon, alternate tracks being oppositely oriented lengthwise of the tape to provide for reproduction by magnetic scanning in opposite directions, which method comprises concurrently recording intelligence in a plurality of parallel tracks on a wide web of magnetizable record sheeting by continuously magnetically scanning the tracks in a single pass from one end of the sheet toward the other with the intelligence recorded in alternate tracks inverted lengthwise of the sheeting and slitting the sheeting between even-numbered groups of tracks in regions intermediate adjacent tracks recorded in opposite directions to provide individual tape records each of which carries an even number of tracks with alternate tracks arranged for reproduction by magnetic scanning in opposite directions.

7. A method for making tape type magnetic records each having an even number of continuous sound record tracks thereon, alternate tracks being oppositely oriented lengthwise of the tape to provide for reproduction by magnetic scanning in opposite directions, which method comprises feeding a wide web of magnetizable record sheeting from a source of supply, during said feeding concurrently recording intelligence in a plurality of parallel tracks on the sheeting by continuously magnetically scanning the tracks in a single pass from one end of the sheet toward the other with the intelligence recorded in alternate tracks inverted lengthwise of the sheeting, and during said feeding slitting the sheeting along lines extended between even-numbered groups of tracks and extended between adjacent tracks recorded in opposite directions, to provide individual tape records each of which carries an even number of tracks with alternate tracks arranged for reproduction by magnetic scanning in opposite directions.

8. The method according to claim 7 in which the recording of intelligence on the sheeting is done in advance of the slitting.

9. The method of claim 5 in which the scanning is effected by feeding the record past a pair of magnetic recording heads respectively in scanning relationship to the two record tracks.

10. The method of claim 5 further characterized by employment of magnetic master record means having recorded thereon the intelligence to be recorded in the oppositely oriented tracks of the two track record being made, the said intelligence being transferred from the master record means to the record being made by scanning the master record means with magnetic pick-up heads, feeding the picked-up signals to magnetic recording heads maintained in scanning relation to the two tracks of the record being made.

11. A method for making a plurality of duplicate tape type magnetic records adapted to be played at a given playback speed and each having two continuous sound record tracks thereon oppositely oriented lengthwise of the record to provide for reproduction by sequential scanning of the two tracks in opposite directions, which method comprises concurrently continuously scanning two master magnetic record tracks respectively containing the material desired on the two tracks of each of the duplicate records to be made by feeding the master record tracks past separate magnetic pick-up heads respectively registering with the two master record tracks, said master scanning being effected at a speed higher than said given playback speed of the duplicate records to be made and the sense of scanning of one master track being from the beginning to the end of the material to be recorded on one track of each of the duplicate records and the sense of scanning of the other master track being from the end to the beginning of the material to be recorded on the other track of each of the duplicate records, and transferring the master material thus scanned to the duplicate records by concurrently continuously scanning both tracks of each duplicate record in the same direction lengthwise thereof, the scanning of the two tracks of each duplicate record being effected by feeding the duplicate record tracks past a pair of separate magnetic recording heads respectively registering with the two duplicate record tracks and respectively connected with said pick-up heads to receive the master material therefrom, the duplicate record track scanning also being at a speed higher than said given playback speed.

References Cited in the file of this patent

UNITED STATES PATENTS

| Number | Name | Date |
|---|---|---|
| 1,187,137 | Gall | June 13, 1916 |
| 1,975,929 | Eldred | Oct. 9, 1934 |
| 2,029,979 | Bernheim | Feb. 4, 1936 |
| 2,427,421 | Rieber | Sept. 16, 1947 |
| 2,503,925 | Tinkham | Apr. 11, 1950 |
| 2,508,485 | Begun | May 23, 1950 |
| 2,604,549 | Begun | July 22, 1952 |

FOREIGN PATENTS

| Number | Country | Date |
|---|---|---|
| 26,040 | Netherlands | Dec. 16, 1931 |
| 221,638 | Switzerland | Sept. 1, 1942 |
| 316,654 | Great Britain | Aug. 2, 1929 |
| 329,775 | Great Britain | May 29, 1930 |
| 824,591 | France | Nov. 10, 1937 |